United States Patent [19]
Ueta et al.

[11] Patent Number: 5,153,490
[45] Date of Patent: Oct. 6, 1992

[54] NUMERICAL CONTROL APPARATUS OF MACHINES

[75] Inventors: Toshihiro Ueta; Ikuo Kuribayashi; Masayuki Kato, all of Mishima; Jun Fujita, Numazu, all of Japan

[73] Assignee: Toshiba Kikai Kabushiki Kaisha, Tokyo, Japan

[21] Appl. No.: 671,406

[22] Filed: Mar. 19, 1991

[30] Foreign Application Priority Data

Mar. 20, 1990 [JP] Japan .................................. 2-71294

[51] Int. Cl.⁵ ...................... G05B 11/01; G06F 15/46
[52] U.S. Cl. .................................. 318/571; 318/570; 318/626; 318/630; 318/574; 364/474.35; 364/167.01
[58] Field of Search .............................. 318/560–660; 364/474.01–474.35, 170

[56] References Cited

U.S. PATENT DOCUMENTS

| | | | |
|---|---|---|---|
| 4,514,813 | 4/1985 | Nozawa et al. | 318/570 X |
| 4,549,120 | 10/1985 | Banno et al. | 318/138 X |
| 4,743,823 | 5/1988 | Fujita | 318/630 |
| 4,864,211 | 9/1989 | Kawaguchi | 318/626 |
| 4,933,800 | 6/1990 | Yang | 361/29 |
| 4,961,036 | 10/1990 | Arikawa | 318/603 |
| 5,015,935 | 5/1991 | Iwashita | 318/630 |

Primary Examiner—Paul Ip
Attorney, Agent, or Firm—Cushman, Darby & Cushman

[57] ABSTRACT

In a machine tool having a table adapted to support a workpiece, a plurality of drive shafts for moving the table in three directional directions by servomotors, servo control apparatus controlling the servomotors in response to position instructions, drive shaft control apparatus including position detectors of the servomotors, each drive shaft control apparatus is made up of a servomotor rotation reversal detector for producing a movement reversal signal, a memory device for storing correction amounts necessary to compensate for a position error of the axis of the spindle of the machine tool which occurs as a result of reversal of the direction of movement of the drive shaft and other drive shafts and a transfer switches for selecting the memory device in response to the movement reversal signal and for feeding back to the servo control apparatus the correction amount read out from the memory device.

6 Claims, 3 Drawing Sheets

NUMERICAL CONTROL APPARATUS OF MACHINES

BACKGROUND OF THE INVENTION

1. Field of the Invention

This invention relates to a numerical control (NC) apparatus including a plurality of driving shafts for moving a table supporting a workpiece member in three dimensional directions, and a spindle for supporting a tool. More particularly, this invention relates to a NC control apparatus wherein profile machining is made by utilizing arc interpolation technique, the position error of the spindle axis can be optimumly corrected at a high accuracy when the directions of movement of respective driving shafts are changed.

2. Description of the Related Art

In a numerically controlled machine tool for performing three dimensional cutting or the like, there are provided driving shafts movable in X, Y and Z directions of rectangular coordinates, driving shaft control apparatus for respective driving shafts and a spindle for mounting a tool. These driving shaft control apparatus are controlled simultaneously for moving a table on which a workpiece is mounted for machining the workpiece three dimensionally. For effecting such multi-shaft simultaneous control a programmed NC control apparatus is generally used. Since the numerically controlled machine tool described above is well known in the art, for the sake of brevity it is not shown in the drawing.

In the driving shaft control apparatus described above, each apparatus is constituted by a servomotor for moving a movable element for carrying a workpiece, servo control means for driving the servomotor in response to a position instruction, and a position detector for detecting the position of the servomotor for feeding back the detected position to the servo control means. These mechanisms are provided for all driving shafts.

In such NC control apparatus, there occurs various position errors due to the presence of mechanical parts, among which backlash error is a typical position error. Various methods have been proposed for compensating for the position error in the directions of movement of respective drive shafts, that is the position error occurring at the time of feeding the movable elements in the same direction. Such prior art methods are disclosed in the Japanese Laid Open patent specification Nos. 3086/1988 and 2074/1977.

In the prior art apparatus, however, a small position error of the spindle occurs when the direction of movement of each drive shaft is reversed.

For example, where the directions of movement of respective drive shafts in the three dimensional directions are reversed while feeding the table of a horizontal type machining center, a small error in parallel with the axis of the spindle occurs, but in the prior art control apparatus such position error has not been corrected.

FIG. 3 is a diagram showing the position error of a horizontal type machining center wherein the axis of the spindle is parallel to the Y axis of table driving axis, the position error being measured by double ball bar test method (DBB), this method being described in detail in a paper entitled "Study on the Motion Accuracy of NC Machine Tools (part 1), described by Yoshiaki Kakino and presented to the spring meeting of the Institute of Precision Machining, held on Sep. 2, 1985 and Method of Evaluation of the Degree of Precision of NC Machine Tool, published by Murata, Sep. 20, 1989, page 20, Chapter 3 "Measuring Apparatus".

FIG. 3 is a diagram showing the result of measurement obtained by measuring the position error of a horizontal type machining center of the table driving shaft wherein the spindle axis is parallel to the Y axis of the table drive shaft by using the DBB method. In FIG. 3, X and Y represent the X and Y coordinate axes of the direction of movement of the table carrying the workpiece, in which the axis of the spindle is parallel with the Y axis.

In a case involving a curved workpiece, for example, a cylinder, when the table is moved from a position ① in the Y axis direction to position ③ in the Y axis direction through a position ② in the X axis direction by using arc interpolation method, the direction of movement of the table in the direction of Y axis is caused to reverse from position ③. At this time, due to a mechanical error, the axis of the spindle is caused to vary in a X axis direction ②. As a consequence, the axis of the spindle would move to the starting point ① through a deviated position ④ in the X axis direction.

Thereafter when the table is started to rotate in the counterclockwise direction from point ② in the X axis direction, since the direction of movement of the table in the Y axis direction is reversed, the position of the axis of the spindle would become erroneous in the direction ② along the X axis. Thus, the table does not pass through point A in the case of clockwise rotation, but instead the table would begin to start from position B to travel from position ① on the Y axis, and is moved toward position B. Thus, the table would be moved from position ① in the Y axis to position ④ in the X axis. Under these conditions, the movement of the table in the Y axis direction is reversed thereby causing a position error of the spindle for the same reason as above described.

Although this error reaches a maximum value when the direction of movement of the drive shaft parallel to the spindle axis is reversed. In the other drive shafts too, similar errors occur when the directions of movements of these drive shafts are reversed.

Since these phenomena are repeated, due to the reversal of the direction of movement of the drive shaft when it is moved in the clockwise direction as well as in the counterclockwise direction, a position error of the spindle axis occurs with the result that the locus of the movement of the spindle will become a double circle as shown by symbols CW and CCW in FIG. 3, thus decreasing the accuracy of the movement of a NC controlled mechanism, and the accuracy of positioning thereby degrading the machining accuracy.

The defects of the prior art NC control apparatus described above will be summarized as follows with reference to FIG. 5. A position instruction Xc is supplied to a servomotor 103 via a first adder 101 and a servo control apparatus 102. The number of rotations or an angular position of the rotor of the servomotor 103 is sensed by an encoder 104 and the output thereof is supplied to one input terminal of a second adder 105. In response to the position instruction Xc, a reversal detector 106 issues an output signal in response to the reversal of the position instruction Xc, and the output signal of the reversal detector 106 is applied to one stationary contact of a transfer switch 107, the stationary contact being normally applied with a zero backlash signal 0.

The other stationary contact of the transfer switch 107 is applied with a compensation data Ax and the output of the transfer switch 107 is applied to the second adder 105. The sum or difference obtained by the second adder 105 is supplied to the other input terminal of the first adder 101 which functions to minimize the position error of the movable member.

SUMMARY OF THE INVENTION

Accordingly, it is an object of this invention to provide a novel NC apparatus of a machine, more particularly a machine tool having a table adapted to support a workpiece, a plurality of drive shafts for moving the table in the X, Y and Z directions of a rectangular coordinate and a profile machining is performed by using circular arc interpolation technique, wherein an optimum and highly accurate compensation can be made for a small position error of the spindle axis.

According to this invention, there is provided numerical control apparatus of a machine including a table adapted to support a workpiece; a plurality of drive shafts for moving the table in three dimensional directions; a spindle of the machine; servomotors provided for each of the drive shafts; servo control apparatus controlling the servomotors in response to position instructions; and drive shaft control apparatus including means for detecting positions of the servomotors, and means for feeding back the detected positions of the servomotors, characterized in that each one of the drive shaft control apparatus comprises; means for detecting reversal of the direction of movement of a corresponding drive shaft for producing a movement reversal signal; memory means for storing a correction amount necessary to compensate for a position error of the axis of the spindle which occurs as a result of the reversal of the direction of movement of each drive shaft; and means for selecting the memory means in response to the movement reversal signal and for feeding back to the servo control apparatus the correction amount read out from the memory means.

DESCRIPTION OF THE PREFERRED EMBODIMENT

Figure 1:
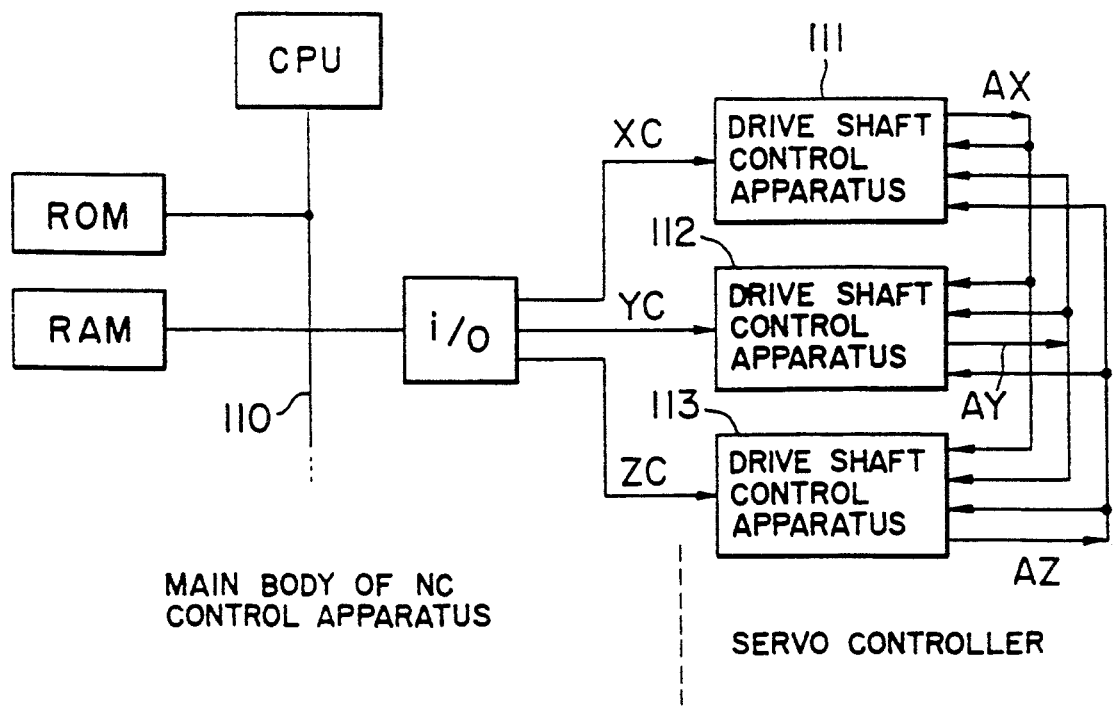
FIG. 1 is a schematic block diagram showing the relation between the main body of a NC control apparatus including a computer and a servocontroller for compensating the position error in the X, Y and Z axis directions of the drive shaft control apparatus.

In the accompanying drawings, FIG. 1 is a simplified block diagram showing an embodiment of a NC control apparatus, constructed in accordance with the teaching of this invention. To the left of dash lines is shown a main body of NC control apparatus including a CPU, a ROM, a RAM and an input/output interface i/o, all connected to a bus line 110 in a manner well known in the art. The input/output interface i/o supplies position instructions Xc, Yc and Zc to drive shaft control apparatus 111, 112 and 113 respectively. The drive shaft control apparatus 111 generates a reversal detection signal Ax which indicates the reversal of the rotation of servomotor 103 (see FIG. 5), the reversal detection signal Ax being supplied to all of the control apparatus 111, 112 and 113. In the same manner, the other drive shaft control apparatus 112 and 113 also generate reversal detection signals Ay and Az which are respectively applied to all drive shaft control apparatus 111, 112 and 113.

Figure 2:
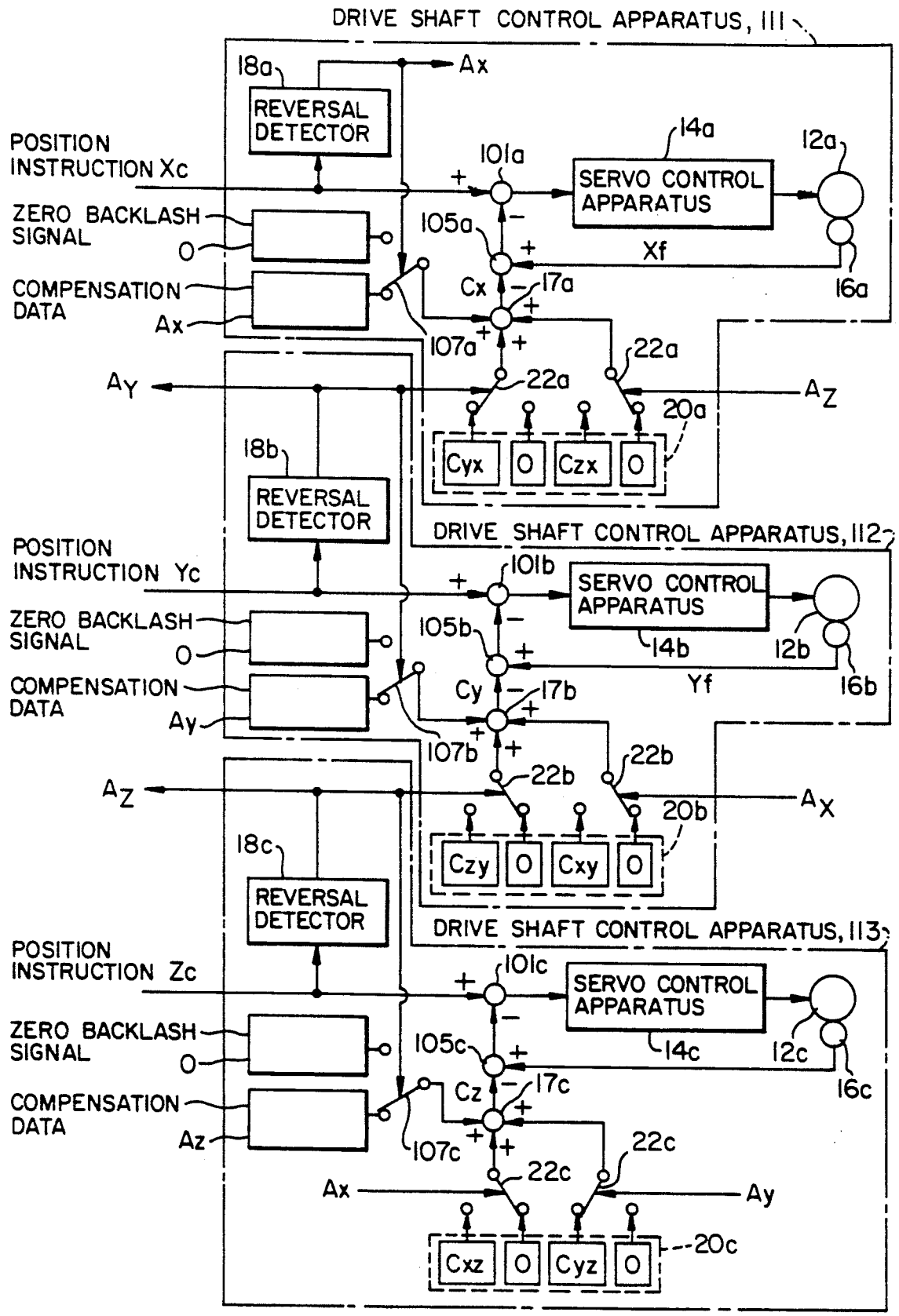
FIG. 2 is a connection diagram showing the details of the connections of the position error compensating apparatus X, Y, Z shown in FIG. 1.

FIG. 2 shows a detailed connection diagram for the drive shaft control apparatus 111, 112 and 113 which control the movements of a table adapted to support a workpiece in the X, Y and Z axes directions of the rectangular coordinate. The following description is made for a case wherein the spindle is parallel with drive shaft Y.

Figure 5:
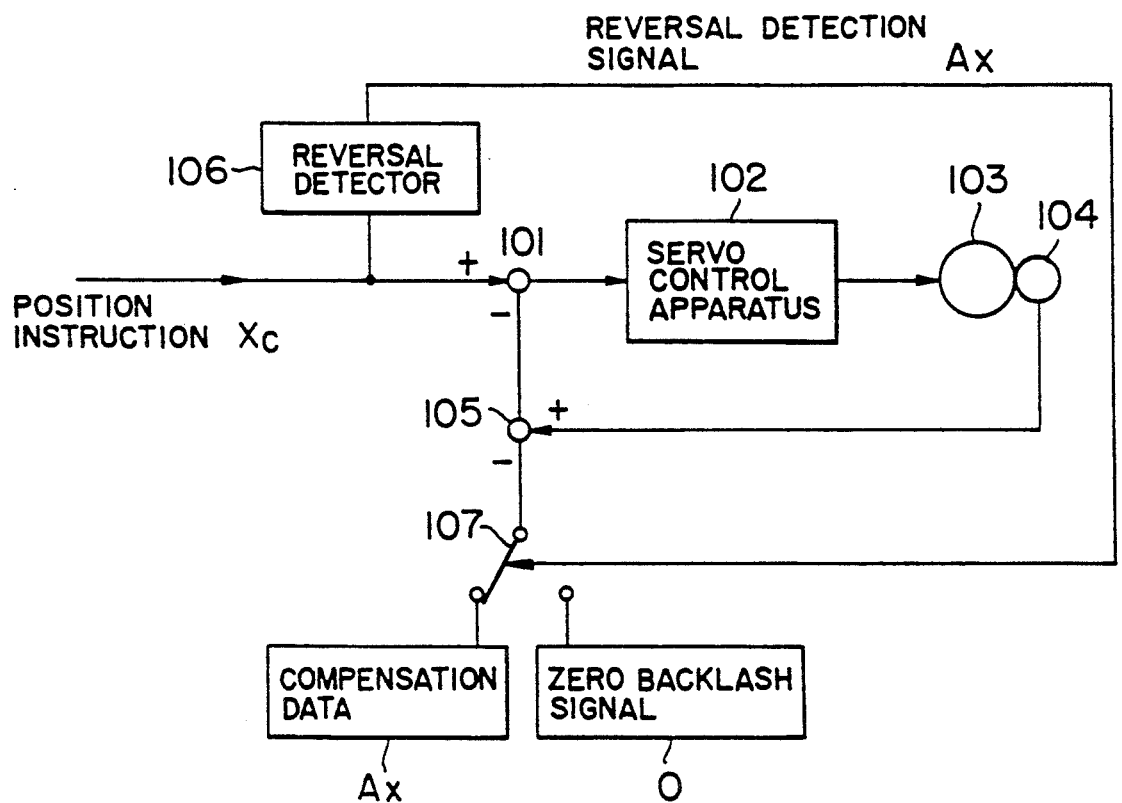
FIG. 5 is a connection diagram showing a prior art NC control apparatus.

Each one of drive shaft control apparatus 111, 112 and 113 comprises servomotors 12a, 12b 12c, servo control apparatus 14a, 14b and 14c for controlling servomotors 12a, 12b and 12c in response to position instructions Xc, Yc and Zc respectively, and position detecting means 16a, 16b and 16c for detecting positions of respective servomotors 12a, 12b, 12c for feeding back the detected positions to respective servo control means 14a, 14b and 14c respectively and position detecting means 16a, 16b and 16c associated with servomotors 12a, 12b and 12c respectively for feeding back detected position signals of servomotors to servo control apparatus 14a, 14b and 14c respectively. Respective drive shaft control apparatus 111, 112 and 113 comprise reversal detectors 18a, 18b and 18c which detect the reversal of the drive shafts for applying their outputs to all drive shaft control apparatus 111, 112 and 113 as has been outlined with reference to FIG. 1, memory means 20a, 20b and 20c respectively storing amounts of compensation which compensate the position errors of the spindle axis caused by the reversals of directions of movement of different drive shafts, and selecting means 22a, 22b and 22c which select memory means 20a, 20b and 20c which are storing the amounts of correction, the selecting means being operated in accordance with the detected results sent from reversal detectors 18a, 18b and 18c associated with respective drive shafts. Of course, in each of the drive shaft control apparatus 111, 112 and 113, the reversal detection signal Ax, Ay or Az is supplied to the transfer switches 107a, 107b and 107c, respectively. As in the prior art as illustrated in FIG. 5, the transfer switches 107a, 107b and 107c select proper compensation signals Cx, Cy and Cz, respectively, or a zero backlash signal 0 in accordance with signals Ax, Ay and Az, respectively. The selected signals are then provided to adders 17a, 17b and 17c, respectively.

In accordance with the signals issued from reversal detectors 18a, 18b and 18c associated with different drive shafts, selecting means 22a, 22b and 22c select memory means 20a, 20b and 20c respectively storing amounts of compensation, thereby feeding back the stored error compensation amounts to the servo control apparatus 14a, 14b and 14c to correct the position errors.

The NC control apparatus of this invention operates as follows. The NC apparatus described above comprises three drive shafts for moving a table of a machine tool adapted to support a workpiece in the X, Y and Z directions of rectangular coordinates, the spindle of a machine tool, drive shaft control apparatus 111, 112 and 113 provided for respective drive shafts. Thus, by simultaneously controlling the drive shaft control apparatus 111, 112 and 113 for moving the table three dimensional machining becomes possible.

The NC control apparatus analyzes position instructions Xc, Yc and Zc of respective drive shafts in accordance with predetermined operation programs prepared by data inputted from outside for sequentially applying position instructions of respective drive shafts to drive shaft control apparatus 111, 112 and 113, respectively.

The position instructions Xc, Yc and Zc are respectively supplied to servo control apparatus 14a, 14b and 14c for driving servomotors 12a, 12b and 12c. The rotations of these motors are detected by position detectors 16a, 16b and 16c and their output signals Xf, Yf and Zf are fed back to the servo control apparatus 14a, 14b and 14c through adders 101 and 105 shown in FIG. 5 whereby the workpiece carried by the table is moved to a working position where the workpiece is worked in X, Y and Z axis directions by a tool mounted on the spindle.

Figure 3:
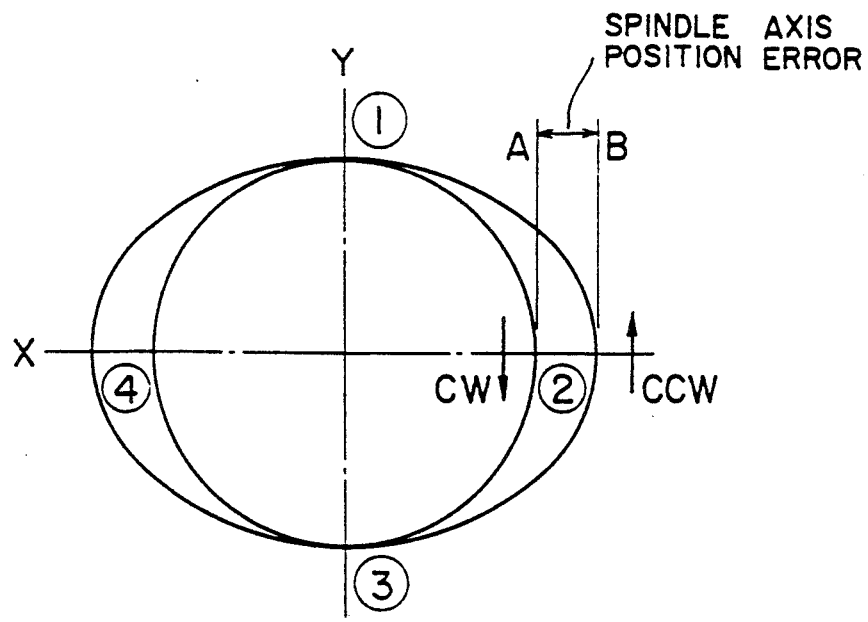
FIG. 3 is a graph showing the locus of the spindle controlled by a prior art NC control apparatus.
Figure 4:
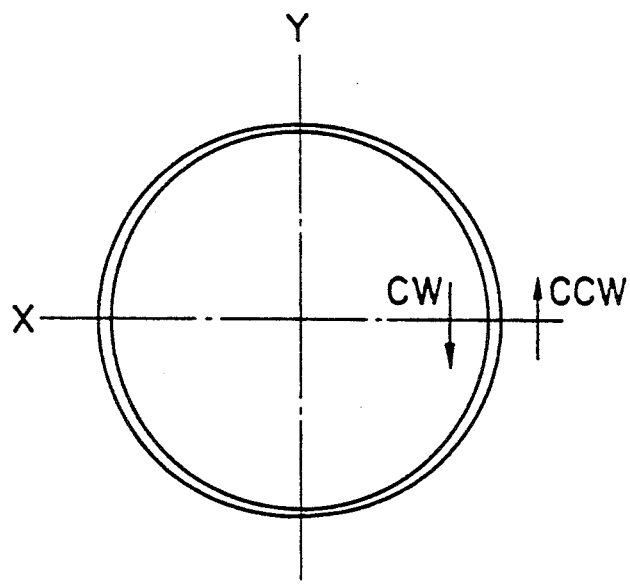
FIG. 4 is a graph showing the result of measurement of the position error of the spindle of a machine tool controlled by the novel NC control apparatus according to this invention.

As has been described with reference to FIG. 3, for machining a curved surface such as a cylinder, the table is started in the clockwise direction from position ① in the Y axis direction by arc interpolation technique to reach position ③ in the Y axis direction through point ② in the X axis direction. When the table reaches position ③ the direction of movement of the table is reversed. At this time, the axis of the spindle would be subjected to an error toward position ② in the X axis direction due to a mechanical error. Then, the axis of the spindle returns to the original position after passing through a deviated position ④ in the X axis direction.

Then when the table is started to rotate in the counterclockwise direction from position ② in the X axis direction, since the direction of movement of the table in the Y axis direction also reverses the position of the axis of the spindle would deviate from position ② in the X axis direction so that when the table is moved in the clockwise direction with the result that the table will start from position B instead of position A. Thus the axis of the spindle is started from position ① in the Y axis direction toward position ④ in the X axis direction. At this time, the direction of movement of the table reverses, thus causing a position error of the axis of the spindle in the same manner as above described.

This error becomes the maximum when the direction of movement of the table reverses in a direction parallel with the axis of the spindle, but similar errors also occur when the directions of movements of the other drive shafts are reversed.

For the purpose of compensating such position errors, the driving control apparatus 111, 112 and 113 are provided with reversal detectors 18a, 18b and 18c respectively which detect the reversal of driving motors 12a, 12b and 12c for supplying their outputs Ax, Ay and Az to the drive shaft control apparatus 111, 112 and 113 as has been described with reference to FIG. 1.

Respective drive shaft control apparatus 111, 112 and 113 are provided with memory means 20a, 20b and 20c respectively which store amounts of correction required for compensating for the position errors determined by premeasuring the position error amounts of the axis of the spindle which occur when the directions of movements of different drive shafts reverse.

In these memory means, Cxy represents the amount of compensation with respect to Y axis when the rotation in the X axis reverses, and Cxz represents the amount of compensation with respect to Z axis when the rotation in the X axis reverses. In the same manner, Cyx represents the amount of compensation with respect to X axis, Cyx represents the amount of compensation with respect to X axis as the movement in the Y axis reverses, Cyz represents the amount of compensation with respect to Z axis when the movement in Y axis reverses, Czx represents the amount of compensation with respect to X axis when the movement in the Z axis reverses, and Czy represents the amount of compensation with respect to Y axis caused by the reversal of the movement in the Z axis. O represents the amount of compensation when there is no reversal of the axis.

In response to signals Ax, Ay and Az produced by reversal detectors corresponding to respective drive shafts, transfer switches 22a, 22b and 22c select memory means 20a, 20b and 20c storing the amounts of compensation so that the error compensation amounts Cx, Cy and Cz are read out from the memory means 20a, 20b and 20c and then fed back to the servo control apparatus 14a, 14b and 14c so as to effect compensation of position errors.

As above described, when the direction of movement of the movable member along the Y axis reverses, the reversal detector 18b supplies its output signal Ay to drive shaft control apparatus 111 and 113 for other drive shafts for selecting compensation amount Cyx (amount of compensation for the X axis error caused by the reversal of the movement in the Y axis and Cyz (amount of correction for Z axis caused by the reversal of the movement in the Y axis) from memory means 20a and 20c by operating transfer switches 22a and 22c. The read out amounts of compensation are fed back to servo control apparatus 14a and 14c thereby compensating for the position error. Consequently the loci of the spindle are shown by CW and CCW as shown in FIG. 3, thus improving the accuracy of movement of mechanical parts of the NC control apparatus as well as the accuracies of positioning and machining.

What is claimed is:

1. A numerical control machine tool comprising:
  a table upon which a workpiece is mounted as a processing object;
  a spindle axis to which is mounted a tool that performs a required processing to said workpiece;
  a plurality of drive shafts each having different axial directions and three-dimensionally moving said table; and
  a plurality of drive shaft control means, each for controlling a position of a corresponding one of said drive shafts, each of said plurality of drive shaft control means comprising:
    servo motor means for driving said corresponding one of said drive shafts to move said table in said axial direction of said corresponding one of said drive shafts in response to a position instruction provided by an external instruction apparatus and indicating a movement amount of said corresponding one of said drive shafts,
    reversal detection means for receiving said position instruction from said external instruction apparatus, detecting, from said position instruction, a reversal instruction indicating reversal of said corresponding one of said drive shafts, and outputting a reversal detection signal in response thereto, means for storing at least two types of compensation amounts, said at least two types of compensation amounts including:

a proper compensation amount for compensating for a position error of said spindle axis caused by backlash of said corresponding one of said drive shafts when said corresponding one of said drive shafts is reversed, and a relative compensation amount for compensating for an influence on said corresponding one of said drive shafts by reversal of another one of said drive shafts when reversal of said another one of said drive shafts has been detected by second reversal detection means of drive shaft control means provided for said another one of said drive shafts, means for selecting an error compensation amount signal, said selecting means determining, in accordance with said reversal detection signals provided by said reversal detection means associated with said corresponding one of said drive shafts, whether said proper compensation amount stored in said storage means is to be included in said error compensation amount signal, and determining, in accordance with reversal detection signals provided by said second reversal detection means, whether said relative compensation amount stored in said storage means is to be included in said error compensation amount signal, position detection means for detecting a position of said servo motor means associated with said corresponding one of said drive shafts and outputting a position detection signal, and servo control means for generating a position compensation signal from said position detection signal provided by said position detection means, in accordance with said error compensation amount signal provided by said selecting means, to compensate a position of said spindle axis, generating a position compensation instruction signal from said position instruction provided by said external instruction apparatus in accordance with said position compensation signal, and controlling driving of said servo motor means in accordance with said position compensation instruction signal.

2. A numerical control machine tool comprising:

a table upon which a workpiece is mounted as a processing object;

a spindle axis to which is mounted a tool that performs a required processing to said workpiece;

first and second drive shafts having axial directions horizontal and at right angles to each other, and a third drive shaft having an axial direction vertical and at right angles to said first and second drive shafts, respectively, said first, second and third drive shafts three-dimensionally moving said table; and first, second and third drive shaft control means, provided for said first, second and third drive shafts, respectively, for controlling positions of said first, second and third drive shafts, respectively, said first, second and third drive shaft control means comprising:

first, second and third servo motor means, respectively, for driving said first, second and third drive shafts, respectively, to move said table in three dimensions in response to first, second and third position instructions, respectively, provided by an external instruction apparatus, first, second and third reversal detection means, respectively, for receiving said first, second and third position instructions, respectively, from said external instruction apparatus, detecting, from said first, second and third position instructions, respectively, first, second and third reversal instructions indicating reversal of said first, second and third drive shafts, respectively, and outputting first, second and third reversal detection signals, respectively, in response thereto, first, second and third storing means, respectively, each for storing first, second and third data, said first, second and third data each comprising at least two types of compensation amounts, respectively, said at least two types of compensation amounts of each of said first, second and third data each including:

first, second and third proper compensation amounts, respectively, for compensating for position errors of said spindle axis caused by backlash of said first, second and third drive shafts, respectively, when said first, second and third drive shafts are reversed, respectively, and first, second and third first-relative compensation amounts, respectively, for compensating for influences on said first, second and third drive shafts, respectively, by reversal of another one of said first, second and third drive shafts when reversal of said another one of said first, second and third drive shafts has been detected by one of said first, second and third reversal detection means of said another one of said first, second and third drive shaft control means, first, second and third means for selecting first, second and third error compensation amount signals, respectively, said first, second and third selecting means determining, in accordance with said first, second and third reversal detection signals provided by said first, second and third reversal detection means, respectively, whether said first, second and third proper compensation amounts stored in said first, second and third storage means are to be included in said first, second and third error compensation amount signals, respectively, and determining, in accordance with said another one of said first, second and third reversal detection signals provided by said another one of said first, second and third reversal detection means, respectively, whether said first, second and third first-relative compensation amounts stored in said first, second and third storage means are to be included in said first, second and third error compensation amount signals, respectively, first, second and third position detection means for detecting positions of said first, second and third servo motor means, respectively, and outputting first, second and third position detection signals, respectively, and first, second and third servo control means for generating first, second and third position compensation signals from said first, second and third position detection signals, respectively, in accordance with said first, second and third error compensation amount signals, respectively, to compensate a position of said spindle axis, generating first, second and third position compensation instruction signals from said position instruction provided by said external instruction apparatus in accordance with said first, second and third position compensation signals, respectively, and controlling driving of said first, second and third servo motor means in accordance with said first, second and third position compensation instruction signals, respectively.

3. A numerical control machine tool as in claim 2, wherein said first, second and third storing means comprise first, second and third proper compensation amount storing means, respectively, for storing said first, second and third proper compensation amounts, respectively, and first, second and third first-relative compensation amount storing means, respectively, for storing said first, second and third first-relative compensation amounts provided by said first, second and third reversal detection means of said another one of said first, second and third drive shaft control means.

4. A numerical control machine tool as in claim 3, wherein
said first, second and third data further comprise first, second and third second-relative compensation amounts, respectively, for compensating for influences on said first, second and third drive shafts, respectively, by reversal of a second another one of said first, second and third drive shafts when reversal of said second another one of said first, second and third drive shafts has been detected by one of said first, second and third reversal detection means of said second another one of said first, second and third drive shaft control means;
said first, second and third storing means further comprise first, second and third second-relative compensation amount storing means, respectively;
said first proper compensation amount storing means stores said first proper compensation amount and zero backlash data, said zero backlash data indicating zero backlash of said first drive shaft;
said first first-relative compensation amount storing means stores said first first-relative compensation amount for compensating for an influence on said first drive shaft by reversal operation of said second drive shaft and first zero compensation amount data indicating zero reversal of said second drive shaft; and
said first second-relative compensation amount storing means stores said first second-relative compensation amount for compensating for an influence on said first drive shaft by reversal operation of said third drive shaft and second zero compensation amount data indicating zero reversal of said third drive shaft.

5. A numerical control machine tool as in claim 2, wherein said first, second and third selecting means comprise:
first, second and third proper compensation amount selecting means, respectively, for selecting, in accordance with said first, second and third reversal detection signals, respectively, whether said first, second and third proper compensation amounts are to be included in said first, second and third error compensation amount signals, respectively; and
first, second and third first-relative compensation amount selecting means, respectively, for selecting, in accordance with said another one of said first, second and third reversal detection signals, respectively, whether said first, second and third first-relative compensation amounts are to be included in said first, second and third error compensation amount signals, respectively.

6. A numerical control machine tool as in claim 5, wherein
said first, second and third data further comprise first, second and third second-relative compensation amounts, respectively, for compensating for influences on said first, second and third drive shafts, respectively, by reversal of a second another one of said first, second and third drive shafts when reversal of said second another one of said first, second and third drive shafts has been detected by one of said first, second and third reversal detection means of said second another one of said first, second and third drive shaft control means;
said first, second and third selecting means further comprise first, second and third second-relative compensation amount selecting means, respectively;
said first relative compensation amount selecting means selects, in accordance with said second reversal detection signal, whether said first first-relative compensation amount is to be included in said first error compensation amount signal; and
said first second-relative compensation amount means selects, in accordance with said third reversal detection signal, whether said first second- relative compensation amount is to be included in said first error compensation amount signal.

* * * * *